United States Patent [19]
Musser, Jr.
[11] 3,894,288
[45] July 8, 1975

[54] BIPOLAR LEVEL DETECTOR

[75] Inventor: Claude Edwin Musser, Jr., Binghamton, N.Y.
[73] Assignee: General Electric Company, Binghamton, N.Y.

[22] Filed: Oct. 4, 1973
[21] Appl. No.: 403,469

[52] U.S. Cl. .............. 328/115; 307/235 R; 307/236; 307/238; 328/118; 328/150
[51] Int. Cl. .............. H03k 5/20
[58] Field of Search .............. 307/235 R, 236, 238; 328/115, 118, 150

[56] References Cited

UNITED STATES PATENTS

| | | | |
|---|---|---|---|
| 3,571,621 | 3/1971 | Hart et al. | 307/235 R |
| 3,573,638 | 4/1971 | Cox, Jr. et al. | 307/235 R |
| 3,626,214 | 12/1971 | Wesner | 307/290 |
| 3,725,795 | 4/1973 | Mesenhimer | 307/235 R |
| 3,789,242 | 1/1974 | Cantor | 307/235 R |

*Primary Examiner*—John Zazworsky
*Attorney, Agent, or Firm*—I. David Blumenfeld

[57] ABSTRACT

The bipolar level detector of this invention senses an incoming signal and produces an indication whenever the signal exceeds a given predetermined level either in the positive or the negative direction. The detector includes an operational amplifier which is normally biased to a saturated state of one polarity (positive or negative) by a pair of networks coupled to its inverting and non-inverting terminals. These networks, consisting of a resistor, a diode and a voltage source, establish the biasing voltages necessary to maintain the operational amplifier in a saturated state of one polarity as long as the input signal to the amplifier remains below a threshold level. If the input signal, whether positive or negative, exceeds the threshold level, one of the biasing networks is disabled. The signal applied to the input terminal of the operating amplifier associated with the disabled network overrides the bias on the other input terminal reversing the saturated state of the amplifier and producing an output indicating that the positive or negative input signal has exceeded a predetermined level. In a modified version of the system, a feedback network is provided for the operational amplifier which adds a "memory" feature to the system so that if the saturated state of the amplifier is switched, indicating that an input signal exceeding the predetermined level has been received, the operational amplifier remains in that switched state even though the input signal may fall below the predetermined level.

7 Claims, 4 Drawing Figures

BIPOLAR LEVEL DETECTOR

The instant invention relates to a detector circuit and more particularly, to a level detector which is capable of sensing and indicating whenever an incoming unidirectional or pulse signal exceeds a predetermined level either in the positive or the negative direction.

In various applications, such as control systems and error detecting systems, for example, it is often desirable to sense when the control or error signal exceeds a predetermined level or threshold as an indication of the occurrence of a certain event or the presence of a certain condition. Furthermore, the device should be capable of detecting excursions both in the positive and negative direction, it should be simple in construction, and use a minimum of components in order to reduce the size, cost, and power consumption of the device. Application has discovered a simple and effective bipolar detector which utilizes but a single operational amplifier and a pair of biasing networks consisting solely of resistors, diodes and reference voltages. By the addition of a simple feedback network, the bipolar detector can also be made to provide a permanent indication of the occurrence of the event, thus providing the detector with a "memory." This, of course, is useful where it is necessary to know that the event represented by the excursion of the input signal has occurred even though that event may have been of limited duration.

It is therefore a primary objective of the instant invention to provide a level detector which senses and detects the excursion of a bipolar signal voltage beyond a threshold level.

Another objective of the invention is to provide a bipolar level detector which is simple in construction, minimizes the number of components, has low power consumption and is highly reliable.

Yet another objective of the invention is to provide a bipolar level detector which includes "memory" to indicate that a level has been detected.

Other advantages and objectives of the invention will become apparent as the description thereof proceeds.

The bipolar detector of the invention comprises an operational amplifier and a pair of biasing networks coupled respectively to the inverting and noninverting input terminals of the amplifier. The polarity and amplitude of the biasing voltages from biasing networks are such as to maintain the operational amplifier in saturation of one polarity either in the absence of an input signal or if the input signal amplitude is less than a predetermined or threshold level. Whenever the input signal exceeds the predetermined level established by the biasing network, one of the networks (depending on the polarity of the signal) is disabled. With the network disabled, a voltage is applied to its associated input terminal which is of the proper polarity and amplitude to overcome the biasing voltage applied to the other terminal and thereby switching the saturated state of the operational amplifier. The polarity of the biasing voltage applied to the amplifier inputs is determined by the polarity of the amplifier output in its normal state. That is, the biasing voltage applied to the inverting terminal must be opposite in polarity to the polarity of the amplifier output in the normal state (when the input signal is below the predetermined level) and the biasing voltage at the non-inverting input terminal must be the same polarity. Thus, if the normal state of the amplifier output is negative saturation, a positive biasing voltage must be applied to the inverting terminal and a negative biasing voltage to the non-inverting terminal. A positive input voltage which exceeds the predetermined level, disables the biasing network associated with the non-inverting terminal and applies a positive voltage to the non-inverting terminal. This positive voltage is of a sufficient amplitude to override the positive biasing voltage at the inverting terminal thereby switching the amplifier state from negative to positive saturation as an indication of the presence of a negative input which exceeds the predetermined level.

Conversely, if the amplifier output is to change from positive to negative saturation as an indication that the input signal has exceeded a predetermined level, the polarity of biasing voltages from the networks to the inverting and non-inverting input terminals must be correspondingly changed, i.e., negative at the inverting and positive at the non-inverting.

The novel features which are believed to be characteristic of this invention are set forth with particularity in the appended claims. The invention itself however, both as to its organization and method of operation, together with further objectives and advantages thereof, may best be understood by reference to the following description taken in connection with the accompanying drawings in which:

Figures 1, 2:
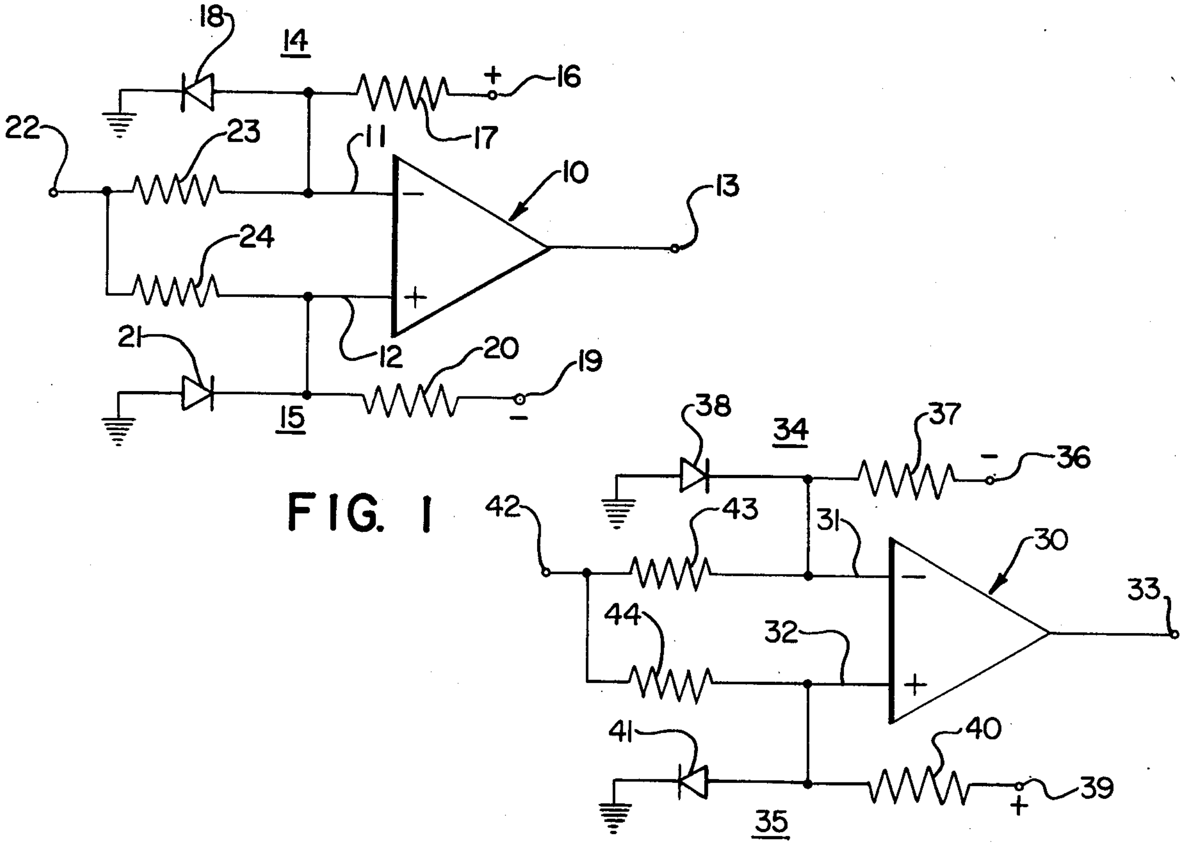
FIG. 1 is a schematic diagram of a bipolar level detector according to the invention wherein the detector output is switched to positive saturation when the input exceeds a predetermined positive or negative level.
FIG. 2 is an alternative embodiment of the bipolar level detector in which the detector output is switched to negative saturation when the input exceeds a predetermined positive or negative level.

The invention may best be understood by referring to FIG. 1 which illustrates one form of a bipolar detector which is driven into positive saturation whenever the amplitude of the input signal exceeds a predetermined level either in the positive or the negative direction. The detector of FIG. 1 includes an operational amplifier 10 having an inverting input terminal 11, a non-inverting input terminal 12 and an output terminal 13. Operational amplifiers of this type are well-known devices which are characterized by the fact that a signal of one polarity applied to the inverting terminal produces an output of the opposite polarity whereas a signal of one polarity applied to the non-inverting produces an output of the same polarity.

Biasing and threshold level networks 14 and 15 are coupled respectively to the inverting and non-inverting terminals to establish the normal state of the detector as well as the threshold or predetermined level of the input signal at which the operational amplifier reverses its state. Each biasing network applies a biasing voltage to its associated input terminal which is of the proper polarity and amplitude to drive the amplifier into saturation of one polarity in the absence of an input signal or if the input signal is below the predetermined level or threshold. The polarity of these biasing voltages is obviously determined by the polarity of the amplifier output in the normal state. For example, if as illustrated in the detector of FIG. 1, negative saturation is the normal state of the amplifier and positive saturation of the amplifier output is to be the indication of the presence of a signal of either polarity which exceeds the predetermined level, then a positive bias voltage must be applied to the inverting terminal and a negative bias voltage to the non-inverting terminal.

Networks 14 and 15 of FIG. 1 thus apply a positive biasing voltage to the inverting terminal and a negative biasing voltage to the non-inverting terminal thereby maintaining the output of operational amplifier 10 in negative saturation in the absence of an input signal. Biasing network 14 includes a source of positive reference voltage, not shown, which is applied to an input terminal 16, and a resistor 17 and diode 18 connected in series between terminal 16 and ground. Diode 18 is so poled that the positive voltage at terminal 16 maintains the diode in the conducting state so that current flows through resistor 17 and diode 18 to ground. The voltage at the junction of diode 18 and resistor 17 is positive with respect to ground by an amount equal to the forward drop across the diode which is approximately 0.06 volts at 1 ma for a 1N3600 diode, for example, and this voltage is the biasing voltage applied inverting terminal 11.

Biasing network 15, on the other hand, includes a source of negative reference voltage, not shown, applied to an input terminal 19, a resistor 20 and a diode 21 connected in series between terminal 19 and ground. Diode 21 is so poled that the negative voltage drives it into conduction and conventional current flows through resistor 20 and diode 21 to the negative source from ground thereby establishing a negative voltage at the junction of these components which is equal to the forward drop of diode 21. Non-inverting input terminal 12 is connected to the junction of resistor 20 and diode 21 so that a negative biasing voltage is applied to the non-inverting terminal. Thus, under normal circumstances, i.e., in the absence of an input signal equalling or exceeding a predetermined level, each of the biasing voltages applied to the input terminals of operational amplifier 10 is of the proper polarity and of sufficient amplitude to drive the operational amplifier into negative saturation.

The bipolar input signal (which may be a unidirectional voltage or current or a voltage or current pulse), is impressed on an input terminal 22 which is connected through resistors 23 and 24 respectively, to the inverting and non-inverting terminals and to the junction of the resistors and diodes of networks 14 and 15. Whenever the bipolar input signal exceeds the predetermined level, one of the biasing networks (depending on the polarity of the signal) is disabled so that the normal biasing voltage is no longer applied to its associated input terminal. Moreover, a voltage of a polarity opposite to the polarity of the biasing voltage is applied to that input terminal. The amplitude of this latter voltage is sufficiently great to override the effect of the other biasing network thereby reversing the state of the operational amplifier. In other words, the presence of a signal of either polarity which exceeds the threshold level, disables one of the biasing networks and also applies a voltage of the proper polarity and amplitude to override the effect of the other biasing network and reverses the saturated state of the amplifier. By virtue of this arrangement, the system is responsive to signals of either polarity with one network being disabled in response to a positive signal exceeding the predetermined level and the other one being disabled in response to a negative signal present which exceeds the predetermined level.

The level of the input voltage required to disable the biasing networks and switch the state of the operational amplifier is a function of the supply voltage at terminals 16 and 19, the resistance of resistors 17, 20, 23 and 24 and the forward voltage drop of diodes 18 and 21. The precise relationship of these values to the threshold level will be described and derived in detail later. At this point, it is sufficient to point out that the threshold level of the detector may be varied by controlling these parameters.

The mode of operation of the bipolar detector under various conditions, i.e., in the absence of a signal, with a signal below the threshold level and upon appearance of a signal exceeding the predetermined level, will be useful in understanding the nature and scope of the invention. Normally, the positive voltage at terminal 16 is sufficient to bias diode 18 into conduction and current flows through resistor 17 and diode 18 to ground. The junction of diode 18 and resistor 17 is positive with respect to ground by an amount equal to the forward voltage drop of the diode (i.e., approximately 0.60 volts at 1 ma for a 1N3600 diode). This positive voltage is impressed on inverting terminal 11 and is sufficient to drive operational amplifier 10 into negative saturation. Similarly, diode 21 in network 15 is so poled that the negative voltage at terminal 19 biases the diode into conduction. Thus, current flows through diode 21 and resistor 20 from ground to the negative voltage source establishing a negative bias voltage at the junction of resistor 20 and diode 21 which is applied to non-inverting terminal 12 and is also of sufficient amplitude to drive the operational amplifier into negative saturation. In the absence of an input signal at terminal 22 or a signal below a desired threshold level, the biasing voltages applied to the inverting and non-inverting terminals are each of the proper polarity and amplitude to drive operational amplifier 10 into negative saturation.

If a positive input voltage appears at terminal 22, current flows from terminal 22 through resistor 23 and diode 18 to ground. However, this current flow will not appreciably change the forward voltage drop across diode 18 and consequently, the biasing voltage at inverting terminal 11 is not appreciably changed. However, the positive input voltage produces a potential difference across the series connected resistors 20 and 24 so that current flows from input terminal 22 through resistors 24 and 20 to terminal 19. This current is in addition to the current flowing through diode 21 and resistor 20. The voltage drop across resistors 24 and 20 due to the current flow from terminal 22 to terminal 19, causes the voltage at the junction of these two resistances, and hence, at the input to non-inverting terminal 12 to go in the positive direction. If the positive input voltage is below the predetermined level, diode 21 continues to conduct and the bias at the non-inverting terminal does not change sufficiently to override the effect of network 14 associated with the inverting terminal. However, if it exceeds the predetermined level, the current flow through resistors 24 and 20 causes the voltage at the junction of these two resistors to become sufficiently positive to reverse bias diode 21. Diode 21 becomes non-conducting, disabling bias network 15 and applying a positive voltage to non-inverting input terminal 12. The positive voltage applied to terminal 12 exceeds the positive biasing voltage applied to inverting terminal 11 thus overriding network 14. As a result, the amplifier output goes rapidly from negative to positive saturation providing an indication that an input signal has been received which exceeds the predetermined threshold level.

The operation of the detector is similar in response to a negative input voltage. With a negative at terminal 22, current flows from ground through resistor 24 and diode 21 to terminal 22. However, this current flow does not appreciably change the voltage at the junction of diode 21 and resistor 20 so that the negative biasing voltage applied to non-inverting terminal 12 does not change appreciably. However, negative voltage at input terminal 22 results in current flow from terminal 16 through resistors 17 and 23 to terminal 22. This current flow produces a voltage drop at the junction of diode 18 and resistance 17 which tends to drive this junction negative. If the voltage at terminal 22 exceeds the predetermined level, the voltage at the junction becomes sufficiently negative to reverse bias diode 18. Diode 18 becomes non-conducting and the voltage at the junction becomes sufficiently negative so that it exceeds the negative bias voltage at non-inverting terminal 12 and operational amplifier 10 switches from the negative to the positive saturated state. Thus, it can be seen that the circuit is responsive to signals of either polarity whenever the signal exceeds the predetermined level. A signal of one polarity disables one of the biasing networks and the signal of the opposite polarity disables the other biasing network.

In the bipolar level detector illustrated in FIG. 1, the operational amplifier is in negative saturation in the absence of an input which exceeds the threshold level and switches to positive saturation as an indication of a signal, of either polarity, which exceeds a predetermined level. It will be obvious that the bipolar detector may also be so constructed that the operational amplifier is normally at positive saturation and is switched to negative saturation as an indication of a positive or negative signal which exceeds the predetermined level. The circuit of FIG. 2 illustrated such a bipolar level detector in which negative saturation is an indication of the presence of a signal exceeding the predetermined level. Thus, the detector shown in FIG. 2 like that of FIG. 1 also includes an operational amplifier 30 having an inverting input terminal 31, a non-inverting input terminal 32 and an output terminal 33.

Biasing and threshold level networks 34 and 35 are coupled to inverting terminal 31 and to non-inverting terminal 32 respectively. Biasing network 34 consists of a source of negative reference voltage, not shown, coupled to terminal 36 and a resistor 37 and a diode 38 connected in series between terminal 36 and ground. Diode 38 is so poled that the negative voltage at terminal 36 drives it into the conducting state so that the voltage at the junction of diode 38 and resistor 37, and hence, the bias voltage applied to the inverting terminal, is a negative voltage which is essentially equal to the forward voltage drop across dide 38. Consequently, in the absence of an input signal which exceeds the predetermined level, a negative voltage is applied to inverting terminal 31 which is of sufficient amplitude to drive operational amplifier 30 into positive saturation.

Biasing network 35 which is coupled to non-inverting input terminal 32 consists of a source of positive reference voltage, not shown, coupled to a terminal 39 and a resistor 40 and a diode 41 connected in series between terminal 39 and ground. Diode 41 is so poled that the positive voltage at terminal 39 drives it into conduction and hence, a positive bias voltage equal to the forward voltage drop across the diode is present at the junction of resistor 40 and diode 41 and is applied to the non-inverting terminal 32. The positive bias voltage from network 35 is also sufficient to drive operational amplifier 30 to positive saturation. In other words, in the absence of an input signal or with an input signal below the predetermined level, each of the biasing voltages applied to the two input terminals is of the proper polarity and of sufficient amplitude to drive the operational amplifier into positive saturation.

The bipolar input signals which are to be detected are applied to an input terminal 42 which is coupled to the biasing networks and the inverting and non-inverting input terminals of the amplifier through resistors 43 and 44.

The operation of the bipolar level detector of FIG. 2 which is normally in positive saturation and goes to negative saturation as an indication of the presence of an input voltage which exceeds the predetermined level, is very similar to the operation of the system described in connection with FIG. 1. Thus, a positive unidirectional voltage at terminal 42 produces current flow through diode 41 of network 35, but this current flow has virtually no effect on the voltage level at the junction of diode 41 and resistor 40 so that the positive voltage applied to non-inverting terminal 32 does not change appreciably. The positive signal at terminal 42 however, produces current flow through resistors 43 and 37 in network 34 and eventually the voltage at the junction of resistor 37 and diode 38 becomes sufficiently positive to drive diode 38 into the non-conducting state and impresses voltage on inverting terminal 31. The amplitude of this positive voltage is greater than that of the negative bias voltage applied to non-inverting terminal 32 and overrides the bias voltage on terminal 32 causing the amplifier to switch rapidly from positive to negative saturation.

Similarly, the appearance of a negative signal which exceeds the predetermined level has no effect on network 34 and diode 38 while resulting in a decreasing voltage at the junction of diode 41 and resistor 40 until diode 41 is driven into the non-conducting state and a negative potential is applied to non-inverting input terminal 32 driving operational amplifier 30 rapidly into the negative saturation as an indication that a signal exceeding the predetermined level has been detected. It is thus apparent that the bipolar level detector of FIG. 2 also detects bipolar signals which exceed a predetermined level except that the output state of the operational amplifier goes to negative saturation, as opposed to positive saturation.

Figures 3, 4:
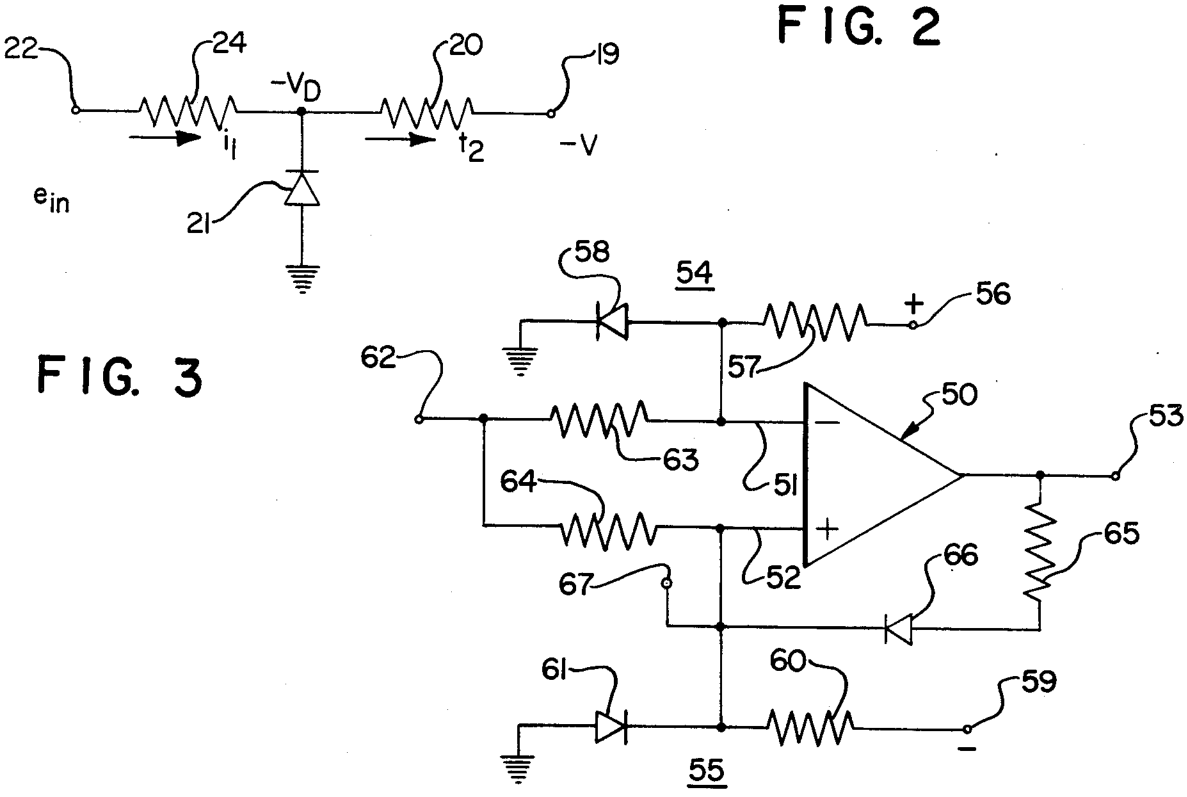
FIG. 3 is an equivalent circuit of part of the bipolar detector and is useful in understanding the operation of the invention.
FIG. 4 is a schematic diagram of a bipolar level detector similar to the one illustrated in FIG. 1 which includes a memory or permanent indication of the occurrence of the event.

The predetermined or threshold input signal level to which the detector responds can be easily derived using the equivalent network shown in FIG. 3. FIG. 3 shows biasing network 15 of FIG. 1 with resistor 24 connected between the input terminal, and the junction of diode 21 and resistor 20. At the trip or switching point when the operational amplifier 10 of FIG. 1 goes from negative saturation to positive saturation, the voltage at the junction of resistors 24 and 20 due to the current flowing from terminal 22 to terminal 19 must equal or be just slightly greater than the forward voltage drop across diode 21, or:

$$-V_D \cong V_{Diode} \qquad (1)$$

Since at this point diode 21 must be reverse biased and voltage at 12 equal to terminal 11.

Similarly, at this point in time $$i_1 - i_2 = 0 \qquad (2)$$

Summing the voltages around the loop, therefore, results in the following expression:

$$\left(\frac{e_{in} - V_D}{R_{24}}\right) - \left(\frac{V_D - (-V)}{R_{20}}\right) = 0 \qquad (3)$$

$$\frac{e_{in}}{R_{24}} - \frac{V_D}{R_{24}} - \frac{V_D}{R_{20}} - \frac{V}{R_{20}} = 0 \qquad (4)$$

Consequently, the predetermined or threshold input voltages level required to switch the operational amplifier from one saturated state to the other is defined by the following equation:

$$\frac{e_{in}}{R_{24}} = V_D \left(\frac{1}{R_{24}} + \frac{1}{R_{20}}\right) + \frac{V}{R_{20}} \qquad (5)$$

$$e_{in} = V_D \left(1 + \frac{R_{24}}{R_{20}}\right) + V \left(\frac{R_{24}}{R_{20}}\right) \qquad (6)$$

Where $V_D$ is the diode forward voltage drop, $V$ iss the external reference voltage applied to the biasing networks, and $R_{24}$ and $R_{20}$ are respectively the resistors in series with the input terminal and the resistance forming part of the biasing network.

In describing the bipolar level detectors of FIG. 1 and 2, the predetermined level of the input signal which produces switching has been assumed to be the same for both positive and negative input signals. It will be appreciated, however, that the invention is not limited to such an arrangement since the predetermined or threshold levels may be made to differ for the positive and negative input signals simply by utilizing different biasing networks, i.e., changing the resistance values, utilizing different values of reference voltage, using diodes which have different values of forward drop and even by inserting resistors in series with one of the diodes (or different resistors with both) to control the voltage at the junction which is connected to the amplifier input terminals.

The bipolar level detectors illustrated in FIG. 1 and 2, are characterized by the fact that although a signal which exceeds the predetermined level may produce switching of the operational amplifier output as an indication of the presence of this voltage, if the input signal at a later time drops below the predetermined level, the operational amplifier reverts to its original state and provides no further indication that the event, as represented by the voltage exceeding the reference level, has occurred. It is also obvious that the output of the bipolar detector may be fed to other circuitry which stores this information. For example, the output of the operational amplifier to a bistable multivibrator or "flip-flop" which is set by the change in the state of the operational amplifier to provide record that the event has occurred. While this approach, and various others which will be obvious does provide a permanent indication of the occurrence of the event, i.e., a memory, of the event, it does require additional circuits or devices to perform this storage function. It would be desirable in many instances to modify the bipolar level detector itself so that once it is set by a signal which exceeds the predetermined level, the detector remains in that state until externally reset.

The circuit of FIG. 4 is a modification of the bipolar detector of FIG. 1 which incorporates such as storage or memory feature. Thus, FIG. 4 includes an operational amplifier 50 having an inverting input terminal 51, a non-inverting input terminal 52 and an output terminal 53. Associated with the inverting terminal 51 is a biasing network 54 consisting of the positive reference voltage source, not shown, coupled to terminal 56, a resistor 57 and a diode 58, connected in series between terminal 56 and ground. A corresponding biasing network 55 is coupled to non-inverting terminal 52 and includes a negative reference voltage source, not shown, coupled to terminal 59, a resistor 60 and a diode 61 connected in series between terminal 59 and ground. The biasing networks, as explained in connection with description of FIG. 1, apply a positive and a negative biasing voltage to inverting and non-inverting terminals respectively, and thus, in the absence of an input signal which exceeds the reference voltage maintain operational amplifier 50 in negative saturated state. An input terminal 62 is connected to the inverting and non-inverting terminals through resistors 63 and 64 and, in the manner previously described, the respective biasing networks are disabled and the state of operational amplifier 50 is switched into positive saturation whenever an input signal, of either polarity, exceeds a predetermined level.

A regenerative feedback loop from the output of operational amplifier 50 to the non-inverting terminal 52 constitutes a means for providing a record or memory of the occurrence by keeping the operational amplifier in the switched state even though the input signal which causes the amplifier to switch states drops below the predetermined level or disappears entirely. The feedback loop consists of a current limiting resistor 65 and a diode 66 connected in series between the output terminal and non-inverting terminal 52. Diode 66 is so poled that whenever the output of operational amplifier 50 goes into positive saturation, diode 66 is driven into conduction and thereby continues to apply a positive voltage to non-inverting terminal 52 thereby maintaining the amplifier in positive saturation even though the input signal to terminal 62 below the predetermined level or disappears. Thus, once the bipolar detector is actuated to indicate that a signal exceeding the predetermined level has been sensed, the operational amplifier remains in that state to provide a permanent record of the occurrence of the event.

The bipolar detector may be reset by applying ground potential or a negative voltage to reset terminal 67 connected to the junction of non-inverting terminal 52 and diode 66. The negative voltage or ground potential at the non-inverting terminal switches the amplifier saturated state and reverse biases diode 66. Diode 66 ceases to conduct thereby interrupting regenerative action of the feedback loop and permitting biasing network 55 to function in the normal manner to return operational amplifier to negative saturation.

It will be apparent that a similar storage or memory feature may be utilized with the bipolar level detector of the type illustrated in FIG. 2, namely, one in which negative saturation is the indication of the occurrence of that event. In such an instance, the polarity of the poling of the diode in the regenerative feedback loop is merely reversed so that the diode is driven into conduction whenever the output of the operational amplifier goes to negative saturation, thereby applying a negative voltage to the non-inverting input terminal and keeping the amplifier in negative saturation once an event has occurred even though the input signal disappears or drops below the predetermined level.

From the previous description, it will be apparent that a bipolar level detector has been described which is simple in operation, minimizes the number of parts necessary, lowers cost, has low power consumption, may be adapted to provide storage or memory of the event and will respond to a signal of either polarity as long as that signal exceeds a predetermined level.

While a particular embodiment of the invention has been illustrated and described, it will be apparent that various modifications thereof may obviously be made in the various arrangements and circuitries described without departing from the true spirit and scope of the invention as defined in the appended claims.

What is claimed as new and desired to be secured by Letters Patent of the United States is:

1. A bipolar level detector comprising:

a. an operational amplifier having inverting and non-inverting input terminals and an output terminal;

b. biasing networks coupled to said inverting and non-inverting inputs, each of said biasing networks includes a source of reference voltage, a resistor and diode connected in series between the source of reference voltage and a point of reference potential, the reference voltages being of opposite polarity so that the diodes in each network are conducting thereby establishing bias voltages of opposite polarity at the junction of the diode and resistor in the respective networks;

c. an input terminal adapted to receive bipolar signals;

d. means coupling said input terminal to said biasing networks for disabling one of said networks and applying a voltage of the proper polarity and amplitude to override the effect of the other network if an input signal of one polarity exceeds a predetermined level, and for disabling the other network and overriding the effect of said one network if an input signal of the opposite polarity exceeds a predetermined level whereby the output of said amplifier is switched to saturation of the opposite polarity whenever the input signal, of either polarity, exceeds its predetermined level.

2. The bipolar detector according to claim 1 wherein individual resistance means are connected between the input terminal and the junction of the resistor and diode of each network whereby the current flow through said individual resistance means in response to input signals which exceed a predetermined level reverse biases the diode in one of the networks to disable said network and produce a voltage of a polarity opposite to the normal bias voltage to override the effect of the other network.

3. The bipolar detector according to claim 1 wherein the network associated with the inverting terminal has a positive reference voltage and conduction of diode produces a positive bias voltage, and the network associated with the non-inverting terminal has a negative reference voltage and conduction of the diode produces a negative bias voltage so that said amplifier is normally in negative saturation and a positive signal exceeding a predetermined level disables the network associated with the non-inverting and a negative signal exceeding a predetermined level disables the network at the inverting terminal whereby the amplifier output switches to positive saturation whenever an input signal of either polarity exceeds its predetermined level.

4. The bipolar detector according to claim 1 wherein the bias network at the inverting terminal produces a positive biasing voltage and the network at the non-inverting terminal a negative biasing voltage so that said amplifier is normally in negative saturation and a positive signal exceeding a predetermined level disables the network at the non-inverting terminal and a negative signal exceeding a predetermined level disables the network at the inverting terminal whereby the amplifier output switches to positive saturation whenever an input signal of either polarity exceeds its predetermined level.

5. The bipolar detector according to claim 1 wherein the network associated with the inverting terminal has a negative reference voltage and conduction of diode produces a negative bias voltage, and the network associated with the non-inverting terminal has a positive reference voltage and conduction of the diode produces a positive bias voltage so that said amplifier is normally in positive saturation and a negative signal exceeding a predetermined level disables the network associated with the non-inverting terminal and a positive signal exceeding a predetermined level disables the network at the inverting terminal whereby the amplifier output switches to negative saturation whenever an input signal of either polarity exceeds its predetermined level.

6. The bipolar detector according to claim 1 wherein the bias network at the inverting terminal produces a negative biasing voltage and the network at the non-inverting terminal a positive biasing voltage so that said amplifier is normally in positive saturation, a negative signal exceeding a predetermined level disables the network at the non-inverting terminal and a positive signal exceeding a predetermined level disables the network at the inverting terminal whereby the amplifier output switches to negative saturation whenever an input signal of either polarity exceeds its predetermined level.

7. The bipolar detector according to claim 1 including a feedback path from the output of said amplifier to the non-inverting terminal, said feedback path including a unidirectional conducting device which is so poled as to be non-conducting when the amplifier output is in its normal saturated state and becomes conducting when the amplifier output state switches polarity in response to an input signal which exceeds its predetermined level to apply a voltage of the proper polarity to the non-inverting terminal to maintain the amplifier output in the switched state even though the input signal subsequently drops below the predetermined level.

* * * * *